United States Patent
Kamdar et al.

(10) Patent No.: US 7,248,860 B2
(45) Date of Patent: Jul. 24, 2007

(54) METHOD AND SYSTEM FOR CUSTOMIZING HOLD-TIME CONTENT IN A MOBILE VEHICLE COMMUNICATION SYSTEM

(75) Inventors: Hitan S. Kamdar, Utica, MI (US); Russell A. Patenaude, Macomb Township, MI (US); Brad T. Reeser, Lake Orion, MI (US); Anthony J. Sumcad, Southfield, MI (US)

(73) Assignee: General Motors Corporation, Detroit, MI (US)

( * ) Notice: Subject to any disclaimer, the term of this patent is extended or adjusted under 35 U.S.C. 154(b) by 147 days.

(21) Appl. No.: 11/012,799

(22) Filed: Dec. 15, 2004

(65) Prior Publication Data

US 2006/0128365 A1 Jun. 15, 2006

(51) Int. Cl.
*H04Q 7/22* (2006.01)
(52) U.S. Cl. .......... 455/414.1; 455/427; 455/428; 455/418; 455/403; 455/569.2; 340/426.2
(58) Field of Classification Search .. 455/569.1–569.2, 455/445, 575.9, 345, 427–428, 12.1, 563, 455/414.1, 403, 418–420; 379/266.01, 88.19, 379/212.01, 201.01–201.3, 32.01–52; 340/422.2, 340/426.19, 539.1, 825.69, 425.5; 701/1
See application file for complete search history.

(56) References Cited

U.S. PATENT DOCUMENTS

| | | | |
|---|---|---|---|
| 5,617,471 A * | 4/1997 | Rogers et al. ......... | 379/212.01 |
| 6,198,942 B1 * | 3/2001 | Hayashi et al. ......... | 455/552.1 |
| 6,535,743 B1 * | 3/2003 | Kennedy et al. ......... | 455/456.1 |
| 6,996,397 B2 * | 2/2006 | Fraser et al. ............. | 455/426.1 |
| 7,023,979 B1 * | 4/2006 | Wu et al. ............... | 379/265.11 |
| 2001/0012335 A1 * | 8/2001 | Kaufman et al. ......... | 379/67.1 |
| 2003/0103617 A1 * | 6/2003 | Brown et al. ......... | 379/265.02 |
| 2003/0143987 A1 * | 7/2003 | Davis et al. ................ | 455/417 |
| 2003/0161464 A1 * | 8/2003 | Rodriguez et al. ...... | 379/266.01 |
| 2003/0182362 A1 * | 9/2003 | Jensen et al. ............... | 709/203 |
| 2004/0023645 A1 * | 2/2004 | Olsen et al. ................ | 455/418 |
| 2004/0203630 A1 * | 10/2004 | Wang ...................... | 455/414.1 |
| 2004/0203632 A1 * | 10/2004 | Schaaf ..................... | 455/414.1 |
| 2004/0203660 A1 * | 10/2004 | Tibrewal et al. ......... | 455/414.1 |
| 2004/0203730 A1 * | 10/2004 | Fraser et al. ............. | 455/426.1 |
| 2005/0090237 A1 * | 4/2005 | Holt et al. .................. | 455/415 |
| 2005/0107072 A1 * | 5/2005 | True et al. ............... | 455/414.1 |
| 2005/0152531 A1 * | 7/2005 | Hamilton et al. ...... | 379/266.01 |
| 2005/0153732 A1 * | 7/2005 | Stotelmyer et al. ...... | 455/552.1 |
| 2005/0175164 A1 * | 8/2005 | Torng et al. ........... | 379/212.01 |
| 2005/0254460 A1 * | 11/2005 | Fraser et al. ................. | 370/328 |
| 2006/0079207 A1 * | 4/2006 | Kamdar et al. ......... | 455/412.1 |
| 2006/0273884 A1 * | 12/2006 | Watkins et al. .......... | 340/425.5 |

\* cited by examiner

*Primary Examiner*—George Eng
*Assistant Examiner*—Kamran Afshar
(74) *Attorney, Agent, or Firm*—Anthony Luke Simon

(57) ABSTRACT

A method of customizing hold-time content in a mobile vehicle communication system includes gathering preference information from the mobile vehicle, determining hold-time content from the preference information and playing the determined hold-time content while the call is on hold. Systems and programs for customizing hold-time content are also provided.

11 Claims, 4 Drawing Sheets

METHOD AND SYSTEM FOR CUSTOMIZING HOLD-TIME CONTENT IN A MOBILE VEHICLE COMMUNICATION SYSTEM

FIELD OF THE INVENTION

This invention relates generally to the management of content provided to a user while a call is on hold in a mobile vehicle communication system. More specifically, the invention relates to a method and system for customizing hold-time content in a mobile vehicle.

BACKGROUND OF THE INVENTION

In a mobile vehicle communication system, the user may occasionally be placed on hold while a call center performs the necessary actions for providing a desired service to the user. During the time that the user's call is on hold, the user may listen to "canned" hold music or messages but does not necessarily receive content that is relevant to the user's call or situation. For example, the user may receive messages saying "Your call is important to us. Please continue to hold" but does not receive messages indicating the actual status of the call.

It would be particularly desirable during an emergency call to keep the user informed of each action that the call center is taking while the user is on hold. In a less urgent example, the user may request directions to a restaurant and it would be desirable to let the user know the steps the call center is taking to locate the restaurant while the user is on hold.

In addition, an advisor may often have to place the user on hold while calling a third-party on behalf of the user. The advisor first collects information from the user, places the user on hold, calls the third-party, repeats to the third-party the information collected and then returns to the user (often placing the third-party on hold) and reports on the third-party conversation to the user or finally connects the user and the third-party together. This is known as a "warm transfer". It would be desirable to provide hold content to the user that reports on the third-party conversation as it is happening, thereby eliminating the need for reporting back to the user the entire third-party conversation.

It would also be desirable to provide hold content to the user that is uniquely directed to the user. For example, if a user is listening to a particular XM radio station in her mobile vehicle, rather than providing "canned" hold music, the call center could continue to play the same radio station as the user's hold music.

Accordingly, it would be desirable to have a system and method for customizing hold-time content so that it is targeted to a specific user of a vehicle or so that it keeps the user updated during a specific call. It is an object of this invention, therefore, to provide a method for customizing hold-time content in a mobile vehicle communication system, and to overcome the deficiencies and obstacles described above.

SUMMARY OF THE INVENTION

One aspect of the invention is a method of customizing hold-time content in a mobile vehicle communication system. Preference information is gathered from the mobile vehicle. Hold-time content is determined based on the preference information and this content is played while the call is on hold.

Another aspect of the invention is a system for customizing hold-time content in a mobile vehicle communication system. The system comprises means for gathering preference information from the mobile vehicle. The system further comprises means for determining hold-time content from the preference information as well as means for playing this content while the call is on hold.

Another aspect of the invention is a computer usable medium including a program for customizing hold-time content in a mobile vehicle communication system. The program comprises computer program code that gathers preference information from the mobile vehicle. The program also includes computer program code that determines hold-time content from the preference information as well as computer program code that plays this content while the call is on hold.

The aforementioned and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
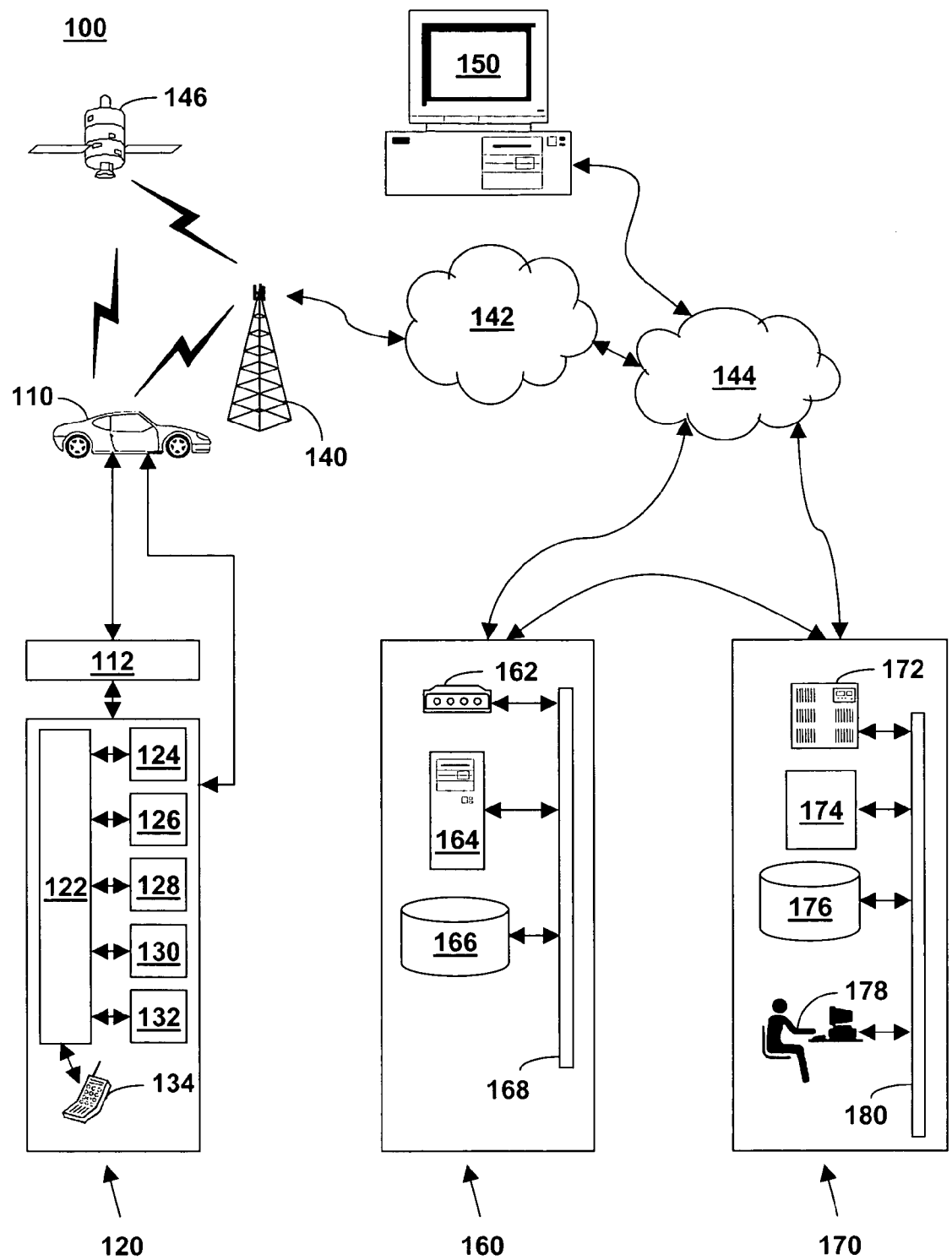
FIG. 1 illustrates a system for customizing hold-time content in a mobile vehicle communication system, in accordance with one embodiment of the current invention.

FIG. 1 illustrates one embodiment of a mobile vehicle communication system (MVCS) 100 for customizing hold-time content. MVCS 100 includes a mobile vehicle communication unit (MVCU) 110, a vehicle communication network 112, a telematics unit 120, one or more wireless carrier systems 140, one or more communication networks 142, one or more land networks 144, one or more satellite broadcast systems 146, one or more client, personal, or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 is also referred to as a mobile vehicle in the discussion below. In operation, MVCU 110 may be implemented as a motor vehicle, a marine vehicle, or as an aircraft. MVCU 110 may include additional components not relevant to the present discussion.

MVCU 110, via a vehicle communication network 112, sends signals to various units of equipment and systems (detailed below) within MVCU 110 to perform various functions such as unlocking a door, opening the trunk, setting personal comfort settings, and calling from telematics unit 120. These functions are performed by sending electronic instructions to a vehicle module configured to perform a certain task or function. In facilitating interactions among the various communication and electronic modules, vehicle communication network 112 utilizes network interfaces such as controller-area network, International Organization for Standardization (ISO) Standard 9141, ISO Standard 11898 for high-speed applications, ISO Standard 11519 for lower speed applications, and Society of Automotive Engineers Standard J1850 for high-speed and lower speed applications.

MVCU 110, via telematics unit 120, sends to and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 may be implemented without one or more of the above listed components such as, for example, speakers 132. Telematics unit 120 may include additional components not relevant to the present discussion. Telematics unit 120 is one example of a vehicle module.

In one embodiment, processor 122 is implemented as a microcontroller, controller, host processor, or vehicle communications processor. In one embodiment, processor 122 is a digital signal processor. In another embodiment, processor 122 is implemented as an application-specific integrated circuit. In another embodiment, processor 122 is implemented as a processor working in conjunction with a central processing unit performing the function of a general-purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example, a digital, dual-mode (e.g., analog and digital), dual-band, multi-mode, or multi-band cellular phone.

Processor 122 executes various computer programs that control programming and operational modes of electronic and mechanical systems within MVCU 110. Processor 122 controls communications (e.g., call signals) between telematics unit 120, wireless carrier system 140, and call center 170. Additionally, processor 122 controls reception of communications from satellite broadcast system 146. In one embodiment, a voice-recognition application is installed in processor 122 that can translate human voice input through microphone 130 to digital signals. Processor 122 generates and accepts digital signals transmitted between telematics unit 120 and vehicle communication network 112 that is connected to various electronic modules in the vehicle. In one embodiment, these digital signals activate programming modes and operation modes, as well as provide for data transfers such as, for example, data over voice channel communication. Signals from processor 122 may be translated into voice messages and sent out through speaker 132.

Wireless carrier system 140 is a wireless communications carrier or a mobile telephone system and transmits to and receives signals from one or more MVCU 110. Wireless carrier system 140 incorporates any type of telecommunications in which electromagnetic waves carry signals over part of or the entire communication path. In one embodiment, wireless carrier system 140 is implemented as any type of broadcast communication in addition to satellite broadcast system 146. In another embodiment, wireless carrier system 140 provides broadcast communication to satellite broadcast system 146 for download to MVCU 110. In one example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. In one embodiment, satellite broadcast system 146 may broadcast over a spectrum in the "S" band of 2.3 GHz that has been allocated by the U.S. Federal Communications Commission for nationwide broadcasting of satellite-based Digital Audio Radio Service (SDARS).

In operation, broadcast services provided by satellite broadcast system 146 are received by telematics unit 120 located within MVCU 110. In one embodiment, broadcast services include various formatted programs based on a package subscription obtained by the user and managed by telematics unit 120. In another embodiment, broadcast services include various formatted data packets based on a package subscription obtained by the user and managed by call center 170. In an example, processor 122 implements data packets received by telematics unit 120.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to computer 150, web-hosting portal 160, and call center 170. In one embodiment, land network 144 is a public-switched telephone network. In another embodiment, land network 144 is implemented as an Internet protocol (IP) network. In other embodiments, land network 144 is implemented as a wired network, an optical network, a fiber network, a wireless network, or a combination thereof. Land network 144 is connected to one or more landline telephones. Communication network 142 and land network 144 connect wireless carrier system 140 to web-hosting portal 160 and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Computer 150 sends user preferences to web-hosting portal 160 through a web-page interface using communication standards such as hypertext transport protocol, or transport-control protocol and Internet protocol. In one embodiment, the data includes directives to change certain programming and operational modes of electronic and mechanical systems within MVCU 110.

In operation, a client utilizes computer 150 to initiate setting or re-setting of user preferences for MVCU 110. For example, a client may utilize computer 150 to indicate preferred hold-time content (e.g. specific radio stations) as user preferences to be played when a call made to call center 170 is placed on hold. User-preference data from client-side software is transmitted to server-side software of web-hosting portal 160. In an example, user-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from data modem 162, data that is then transferred to web server 164. Data modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations, preferred hold-time content, and theft alarm settings. For each client, the web server 164, potentially stores hundreds of preferences for wireless vehicle communication, networking, maintenance, and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one example, the call center 170 is a telematics call center, facilitating communications to and from telematics unit 120 in MVCU 110. In another example, the call center 170 is a voice call center, providing verbal communications between an advisor in the call center 170 and a subscriber in a mobile vehicle. In another example, the call center 170 contains each of these functions. In other embodiments, call center 170 and web-hosting portal 160 are located in the same or different facilities. Calls to call center 170 may be placed on hold and content played from the call center 170 while the call is on hold maybe customized according to the present invention.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services including initiating data over voice channel wireless communication, enrollment services, navigation assistance, directory assistance, roadside assistance, business or residential assistance, information services assistance, emergency assistance, and communications assistance. In one embodiment, communication services manager 174 manages and customizes hold-time content to be played while a call to call center 170 is on hold, as described further below. Communication services manager 174 receives service-preference requests for a variety of services from the client via computer 150, web-hosting portal 160, and land network 144. Communication services manager 174 transmits user-preference and other data such as, for example, primary diagnostic script to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor/automaton. For example, a virtual advisor is implemented as a synthesized voice interface responding to requests from telematics unit 120 in MVCU 110. In accordance with the present invention, the virtual advisor may also provide status updates to the user while a call is on hold.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, automated vehicle diagnostic function, and communications assistance. In one embodiment of the invention, communications services advisor 178 provides hold-time content to the user according to the method of the present invention. Communication services advisor 178 communicates with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to telematics unit 120 within mobile MVCU 110 from call center 170. In one embodiment, the call is routed to telematics unit 120 from call center 170 via land network 144, communication network 142, and wireless carrier system 140. In another embodiment, an outbound communication is routed to telematics unit 120 from call center 170 via land network 144, communication network 142, wireless carrier system 140, and satellite broadcast system 146. In this embodiment, an inbound communication is routed to call center 170 from telematics unit 120 via wireless carrier system 140, communication network 142, and land network 144.

In accordance with one embodiment of the present invention, MVCS 100 serves as a system for customizing hold-time content for a target user. A signal is sent to call center 170 indicating that the call made by MVCU 110 to the call center 170 is on hold. Using the method of the present invention, call center 170 may determine what hold-time content is appropriate during the hold time and may then play this hold-time content. Telematics unit 120 may monitor, filter, and send signals that comprise the hold-time content. Such signals may be received, for example, from satellite broadcasts, radio broadcasts, or other wireless communication systems. Telematics unit 120 may play the hold-time content over output devices such as speaker 132 and visual display devices (not shown).

Computer program code containing suitable instructions to select and manage hold-time content may reside in part at call center 170, MVCU 110, or telematics unit 120 or at any suitable component of these locations. For example, a program including computer program code to determine appropriate customized hold-time content may reside at call center 170. Meanwhile, a program including computer program code to play hold-time content at MVCU 110 may reside at telematics unit 120 or at the mobile phone 134 of telematics unit 120.

Figure 2:
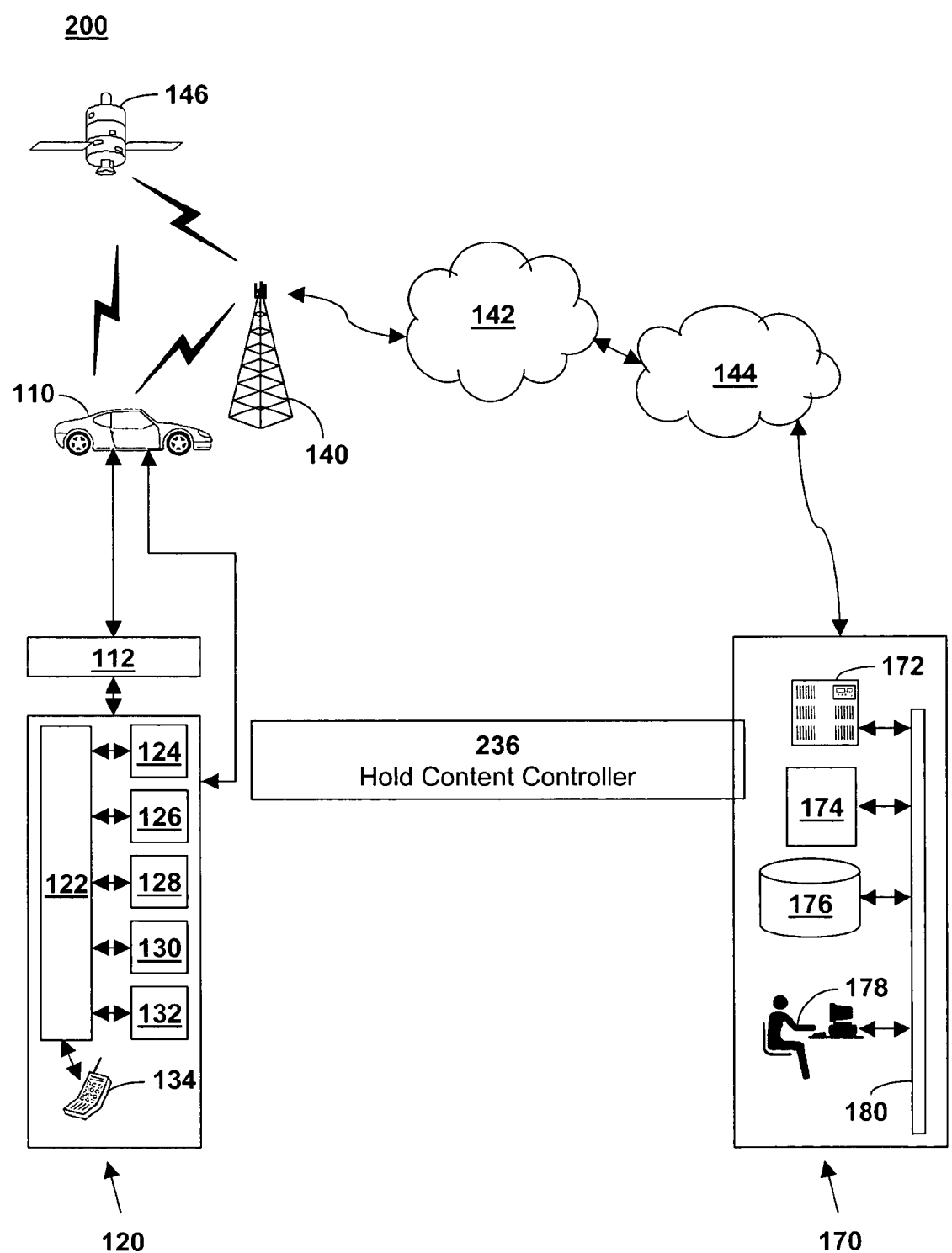
FIG. 2 illustrates a system for customizing hold-time content in a mobile vehicle communication system, in accordance with another embodiment of the current invention.

FIG. 2 illustrates another embodiment of a mobile vehicle communication system (MVCS) 200 for customizing hold-time content. The components shown in FIG. 2 may also be used in conjunction with one or more of the components of mobile vehicle communication system 100, above.

System 200 includes a vehicle network 112, telematics unit 120, and call center 170 as well as one or more of their separate components, as described above. System 200 further comprises a hold content controller 236.

Hold content controller 236 is any suitable processor for customizing hold-time content and/or for playing this content during a call to call center 170. Hold content controller 236 may be connected to telematics unit 120 with a cable or over the vehicle communication network 112. In one embodiment, hold content controller 236 may be embedded within telematics unit 120. Telematics unit 120 may monitor, filter, and send signals that are received from hold content controller 236 to output devices such as speaker 132 and visual display devices (not shown).

Alternatively, as seen in FIG. 2, hold content controller 236 is in communication with call center 170. In this situation, hold content controller 236 determines, customizes and otherwise manages the appropriate hold-time content. The determined hold-time content may be sent by hold content controller 236 from call center 170 to telematics unit 120.

Hold content controller 236 may communicate with call center 170 to determine the status of a call from telematics unit 120. If the call is on hold, hold content controller 236 may gather information in order to customize hold-time content for playback during the time the call is on hold.

In an emergency call situation, for example, hold content controller 236 may monitor the actions being conducted by the call center on behalf of the user. Hold content controller 236 may accomplish this by logging and interpreting the keystrokes, mouse clicks and/or data entries performed at the call center 170, as is known in the art. At a typical call center, it is known in the art that certain keystrokes indicate corresponding actions such as pressing an ENTER button means "connect the call"; pressing an END button indicates "hang up call", etc. As hold content controller 236 monitors the keystrokes/mouse clicks, hold content controller 236 provides customized hold-time content to the user in the form of status reports, such as "now the call center is calling the police" or "the call center is calling the ambulance", or "the call center is connecting you to the police", etc.

In another less critical situation, the user may request a point of interest, such as the location of a restaurant. As hold content controller 236 monitors the keystrokes/mouse clicks, hold content controller 236 provides customized hold-time content to the user in the form of confirmation reports, such as "you requested the call center to look up Pompeii Pizza near your vehicle location. The call center is entering your vehicle location as Chicago". In this embodiment, as the user hears the hold-time content, s/he may be given the option to confirm. Thus, the hold-time content could take the form of "The call center is entering your vehicle location as Chicago. Proceed?" followed by "The call center has found a Pompeii Pizza at Madison and LaSalle. Dial?"

In yet another situation, the user may be on hold for a variety of reasons and the call center 170 would play customized hold-content to suit the user's preference. Such content could be determined by gathering information about MVCU 110 using SDARS (XM, Sirius, etc.), AM/FM, CD, Video, etc. as inputs. Multi-media, environmental, and vehicle parameters are then transmitted to call center 170 upon the Vehicle Communications Platform (VCP). These parameters may be transmitted, for example, as the call is first connected or once the call is placed on hold. The transmission may occur via wireless connection, SMS, etc.

In one embodiment of the invention, call center 170 and/or hold content controller 236 then customizes hold-time content by comparing the transmitted parameters (that describe the vehicle's current settings) against a database of potential hold-time content matches. For example, if the MVCU 110 radio is tuned to an XM Blues station, once placed on hold, call center 170 may continue to play the same station over the air from the call center 170 into MVCU 110. Alternatively, call center 170 and/or hold content controller 236 may play a rival station as hold-time content. Alternatively, call center 170 and/or hold content controller 236 may play directed third-party advertising as hold-time content. For example, if call center 170 or hold content controller 236 determines that a children's movie is being played in the MVCU 110 DVD player, the hold-time content played may be advertising for a children's XM radio station.

Call center 170 and/or hold-content controller 236 gather preference information for hold-time content for example, by reading the AM/FM, CD player, MP3, etc., by looking in a categorized database of stations or artists, or by matching the vehicle's current GPS location to local stations to tune to the closest corresponding SDARS channel or the same channel containing related sponsor content.

Other inputs from MVCU 110 may also be used to enhance hold-time content. For instance, if call center 170 and/or hold-content controller 236 determine that MVCU's 110 windshield wipers are on, location-based weather may be delivered as hold-time content. If call center 170 and/or hold-content controller 236 determined that MVCU 110 is in a known busy traffic area, hold-time content may be traffic reports for that area. Call center 170 and/or hold content controller 236 may monitor diagnostic codes such as oil life of the vehicle. Depending on the status of the codes, call center 170 and/or hold content controller 236 may present hold-time content suggesting trips to the user's mobile vehicle dealer for appropriate services.

Alternatively, the user may enter preferred hold-time content at computer 150. This content may be accessed by call center 170 and/or hold content controller 236 whenever the user is on hold. For example, the user may indicate at computer 150 that s/he would like to be reminded about upcoming vehicle service requirements whenever s/he is placed on hold. Or the user may ask for advertising from preferred companies when s/he is placed on hold. As stated above, the user may also indicate music preference for hold-time content.

Figure 3:
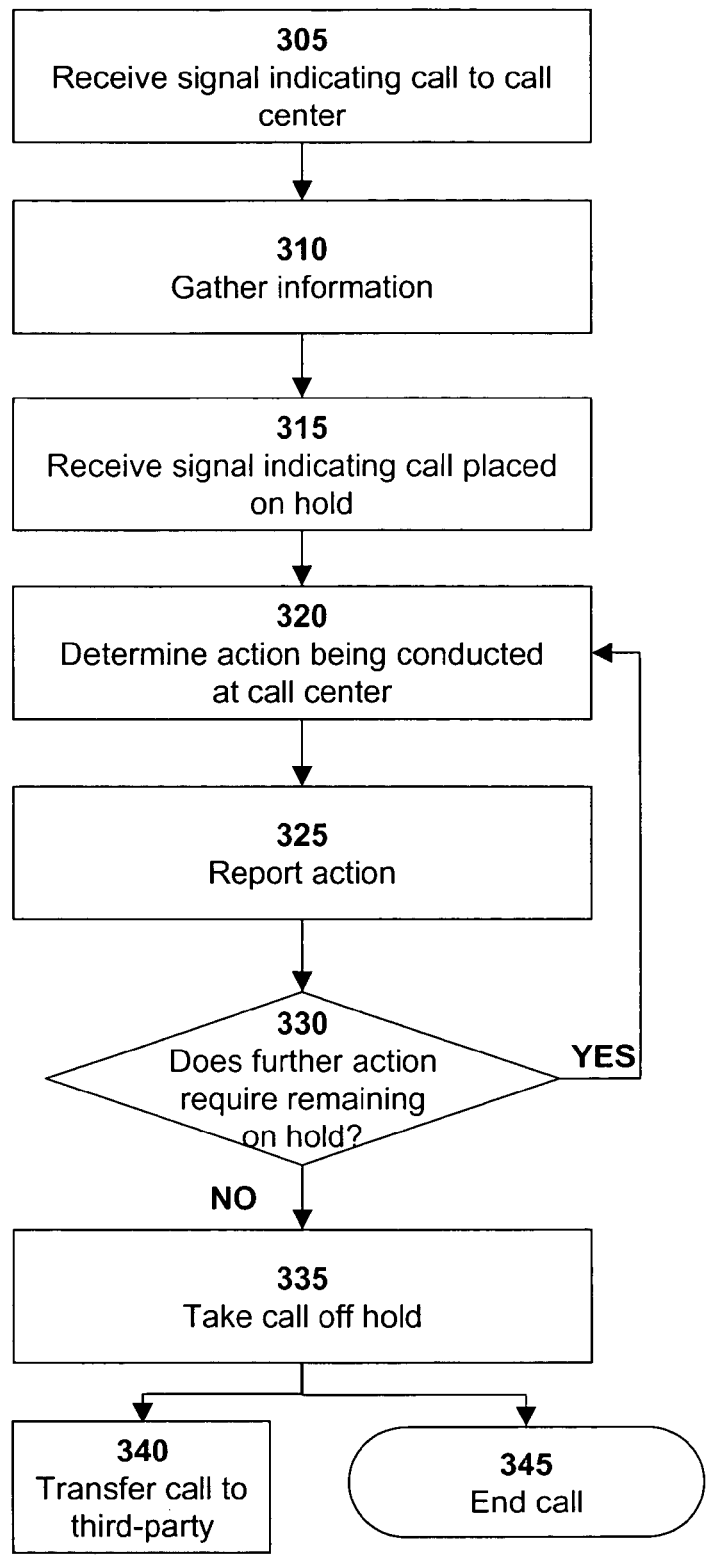
FIG. 3 illustrates a method for customizing hold-time content in a mobile vehicle communication system, in accordance with one embodiment of the current invention.

FIG. 3 illustrates a method 300 for customizing hold-time content, in accordance with one embodiment of the current invention. Although the steps described in method 300 are shown in a given order, the steps are not limited to the order illustrated. Moreover, not every step is required to accomplish the method of the present invention. In the embodiment of FIG. 3, hold-time content is provided to the user based on the nature of the user's call. For example, the hold-time content is customized as call status messages to the user.

As seen at block 305, a signal is received indicating that a call has been placed from MVCU 110 to the call center 170. In one embodiment, this signal may be received by the call center 170. In another embodiment, hold content controller 236 receives the signal.

As seen at block 310, information may be gathered from the user indicating the nature of the call. In one embodiment, this information is gathered at the call center 170. For example, a live advisor or virtual advisor may gather information about the call.

As seen at block 315, a signal is received indicating that the call from MVCU 110 to the call center 170 is now on hold. In one embodiment, this signal may be received by the call center 170. In another embodiment, hold content controller 236 receives the signal.

As seen at block 320, while the call is on hold, call center 170 and/or hold content controller 236 determine the action being taken on the user's behalf at the call center 170. This may be accomplished for example, by logging and interpreting a keystroke, mouse click or data entry performed at the call center 170, as is known in the art. At a typical call center 170, it is known in the art that certain keystrokes indicate corresponding actions such as pressing an ENTER button means "connect the call" pressing an END button indicates "hang up call", etc.

As seen at block 325, call center 170 and/or hold content controller 236 reports the action determined at block 320 to the user in the form of a hold-content message. For example, if it is determined at block 320 that a data entry of the local fire station's phone number has been made, the user may hear a hold-content message such as "the call center is dialing the local fire station's phone number."

As seen at block 330, it is then assessed by call center 170 and/or hold content controller 236 whether a new action is being performed that requires the call to remain on hold.

If at block 330 the call remains on hold, the method returns to block 320 wherein the call center 170 and/or hold content controller 236 monitor and determine the new action and provide new hold-time status messages to the user based on the new action. This may be repeated for any number of actions performed while the call is on hold.

Alternatively, if at block 330 no new action requires the user to remain on hold, the call center 170 may take the call off hold as seen at block 335.

As seen at block 340, once the call is off hold-time, the call center 170 may connect the user and a third party. In one embodiment call center 170 and/or hold content controller 236 reports this action as hold-time content as well.

Alternatively, once the call is off hold-time, the call center 170 ends the call, as seen at block 345.

Figure 4:
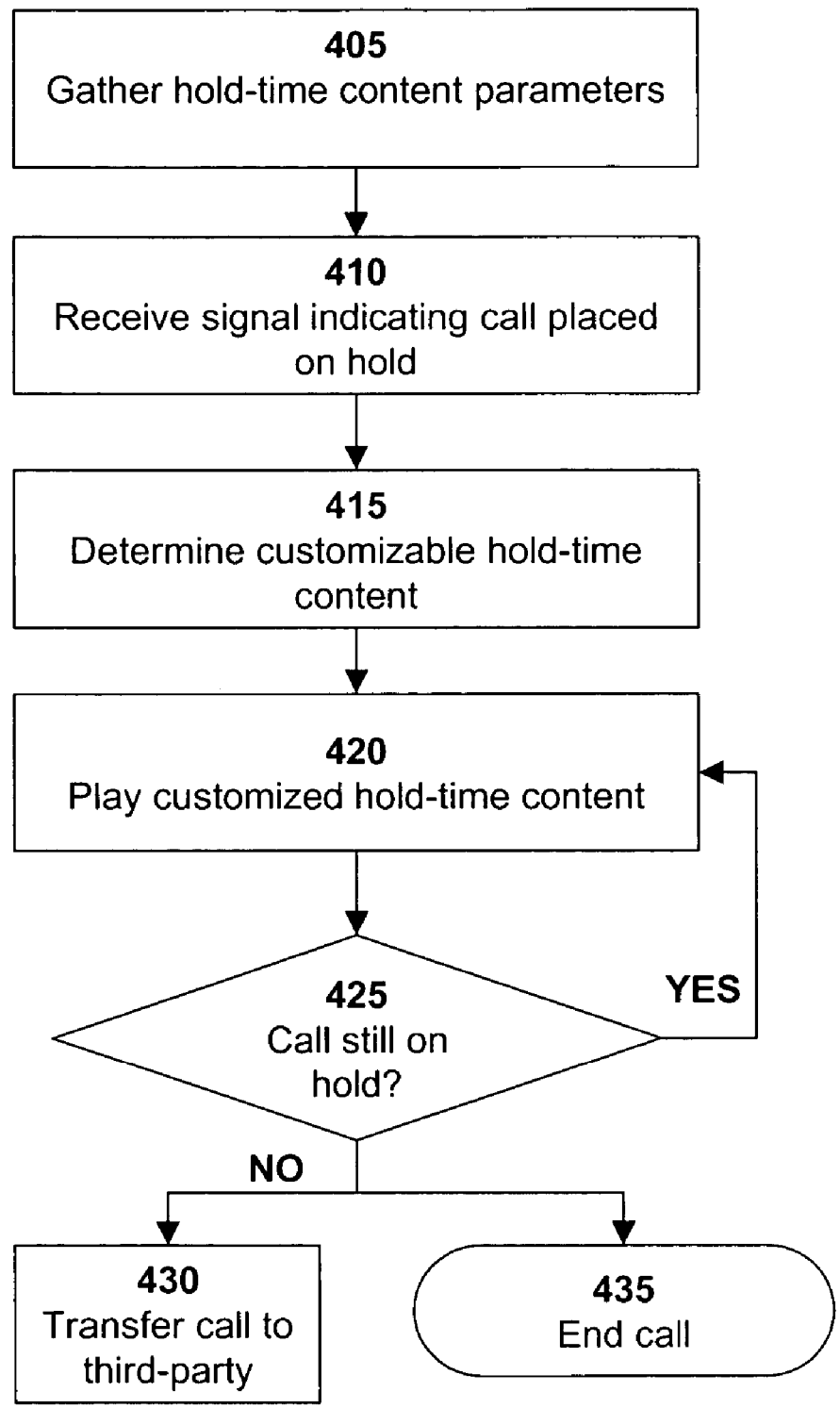
FIG. 4 illustrates a method for customizing hold-time content in a mobile vehicle communication system, in accordance with another embodiment of the current invention.

FIG. 4 illustrates a method 400 for customizing hold-time content, in accordance with another embodiment of the current invention. Although the steps described in method 400 are shown in a given order, the steps are not limited to the order illustrated. Moreover, not every step is required to accomplish the method of the present invention. In the embodiment of FIG. 4, hold-time content is provided to the user based on the user's preferences. For example, the hold-time content is customized as musical, visual or advertising content directed to the user's preferences.

As seen at block 405, information may be gathered from the user indicating the user's hold-time content parameters. In one embodiment, this information is gathered at the call center 170. For example, a live advisor or virtual advisor may gather hold-time content preferences. Alternatively, such content is determined from MVCU 110 itself using SDARS (XM, Sirius, etc.), AM/FM, CD, Video, etc. as inputs. Such information may also be gathered by reading the AM/FM, CD player, MP3, etc., by looking in a categorized database of stations or artists, or by matching the vehicle's current GPS location to local stations to tune to the closest corresponding SDARS channel or the same channel containing related sponsor content. Such preferences may also be determined by examining MVCU 110 vehicle settings such as windshield wiper status or diagnostic codes indicating the status of oil life, etc. Hold-time content preferences may be determined from the vehicle's location (e.g. busy traffic area, rural area, etc.) The user may also enter preferred hold-time content at computer 150.

As seen at block 410, a signal is received indicating that the call from MVCU 110 to the call center 170 is now on hold. In one embodiment, this signal may be received by the call center 170. In another embodiment, hold content controller 236 receives the signal. In some embodiments of the invention, the parameters gathered at block 405 are also transmitted to call center 170 at this time via wireless connection, SMS, etc. These parameters may also be transmitted as the call is first connected.

As seen at block 415, the customizable hold-time content to be played is determined. In one embodiment of the invention, call center 170 and/or hold content controller 236 accomplishes this by comparing the transmitted parameters (that describe the vehicle's current settings) against a database of potential hold-time content matches.

As seen at block 420, call center 170 and/or hold content controller 236 then play the customized hold-time content while the call is on hold.

As seen at block 425, it is then assessed by call center 170 and/or hold content controller 236 whether the call remains on hold.

If at block 425 the call remains on hold, the method returns to block 420 wherein the call center 170 and/or hold content controller 236 continue to play the customized hold-time content.

If at block 425 the call is taken off hold, the call center 170 may connect the user and a third party as seen at block 430. Alternatively, once the call is off hold-time, the call center 170 ends the call as seen at block 435.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of customizing hold-time content during a telematics call from a mobile vehicle, comprising:
    gathering preference information from the mobile vehicle;
    determining hold-time content from the preference information;
    playing the determined hold-time content while the call is on hold with a call center;
    monitoring an action conducted by the call center while the call is on hold; and
    transmitting via a wireless communication network, while the call is on hold, at least one of a status report or a confirmation report to the mobile vehicle in response to the monitoring;
    wherein the at least one of the status report or the confirmation report is selected from an update that the call center is contacting a third-party, an update that the call center is connecting the mobile vehicle to a third-party, an update that the call center is performing a requested task, an update that the call center needs approval to proceed with a requested task, and combinations thereof.

2. The method of claim 1, further comprising:
receiving a signal that the call is on hold.

3. The method of claim 1, further comprising:
inputting the preference information at a user interface.

4. The method of claim 1, further comprising:
accessing user settings in the mobile vehicle to determine the preference information.

5. The method of claim 1, further comprising:
generating the customized hold-time content based on third-party information.

6. The method of claim 1 wherein the at least one of the status report or the confirmation report is the update that the call center is connecting the mobile vehicle to a third-party, and wherein the method further comprises:
    establishing a communication between the mobile vehicle and the third-party; and
    disconnecting the call between the mobile vehicle and the call center after the establishing the communication between the mobile vehicle and the third-party.

7. A system of customizing hold-time content during a telematics call from a mobile vehicle, comprising:
    means for gathering preference information from the mobile vehicle;
    means for determining hold-time content from the preference information;
    means for playing the determined hold-time content while the call is on hold with a call center;
    means for monitoring an action conducted by the call center while the call is on hold; and
    means for transmitting via a wireless communication network, while the call is on hold, at least one of a status report or a confirmation report to the mobile vehicle in response to the monitoring;
    wherein the at least one of the status report or the confirmation report is selected from an update that the call center is contacting a third-party, an update that the call center is connecting the mobile vehicle to a third-party, an update that the call center is performing a requested task, an update that the call center needs approval to proceed with a requested task, and combinations thereof.

8. The system of claim 7, further comprising:
means for receiving a signal that the call is on hold.

9. The system of claim 7, further comprising:
means for inputting the preference information at a user interface.

10. The system of claim 7, further comprising:
means for accessing user settings in the mobile vehicle to determine the preference information.

11. The system of claim 7 wherein the at least one of the status report or the confirmation report is the update that the call center is connecting the mobile vehicle to the third-party, and wherein the system further comprises:
    means for establishing a communication between the mobile vehicle and the third-party; and
    means for disconnecting the call between the mobile vehicle and the call center after establishing the communication between the mobile vehicle and the third-party.

* * * * *